US005379207A

United States Patent [19]

Shah

[11] Patent Number: 5,379,207

[45] Date of Patent: Jan. 3, 1995

[54] CONTROLLED LEAKAGE FIELD MULTI-INTERPHASE TRANSFORMER EMPLOYING C-SHAPED LAMINATED MAGNETIC CORE

[75] Inventor: Manoj R. Shah, Latham, N.Y.

[73] Assignee: General Electric Co., Schenectady, N.Y.

[21] Appl. No.: 991,194

[22] Filed: Dec. 16, 1992

[51] Int. Cl.[6] ..................... H02M 7/00

[52] U.S. Cl. ..................... 363/64; 336/5; 323/362

[58] Field of Search ..................... 363/5, 64, 161, 162; 336/5, 171; 323/361, 362

[56] References Cited

U.S. PATENT DOCUMENTS

| | | | |
|---|---|---|---|
| 2,022,341 | 11/1935 | Meyer-Delius . | |
| 2,367,927 | 1/1945 | Chubb . | |
| 2,899,656 | 8/1959 | Smith | 336/211 |
| 3,328,738 | 6/1967 | Broverman et al. | 336/215 |
| 3,395,373 | 7/1968 | Stephens | 336/12 |
| 3,431,483 | 3/1969 | Lafuze . | |
| 3,504,318 | 3/1970 | Wilburn et al. | 336/12 |
| 3,585,484 | 6/1971 | Dortort | 336/170 |
| 4,099,066 | 7/1978 | Beggs . | |
| 4,122,385 | 10/1978 | Oberbeck | 336/178 |
| 4,409,523 | 10/1983 | Yasumura | 315/371 |
| 4,460,950 | 7/1984 | Finney | 363/44 |
| 4,531,108 | 7/1985 | Brandes | 336/5 |
| 4,853,664 | 8/1989 | Asakura | 336/12 |
| 5,003,277 | 3/1991 | Sokai et al. | 336/10 |
| 5,050,058 | 9/1991 | April et al. | 363/65 |
| 5,122,947 | 6/1992 | Hishiki | 363/61 |

FOREIGN PATENT DOCUMENTS

| | | | |
|---|---|---|---|
| 158070 | 2/1933 | Switzerland | H01F 33/02 |
| 680206 | 10/1952 | United Kingdom | H01F 33/00 |

*Primary Examiner*—Jeffrey L. Sterrett
*Attorney, Agent, or Firm*—Nixon & Vanderhye

[57] ABSTRACT

A multi-interphase transformer for use in power conditioners such as cycloconverters wherein polyphase input power sources with more than six phases and requiring interphase transformers for paralleling the polyphase outputs is disclosed, Such multi-interphase transformers include three or more C-shaped laminated cores with air gaps formed between the angled planar surfaces of the core legs. Only one such multi-interphase transformer is required per output phase,

9 Claims, 4 Drawing Sheets

Fig. 1 (PRIOR ART)
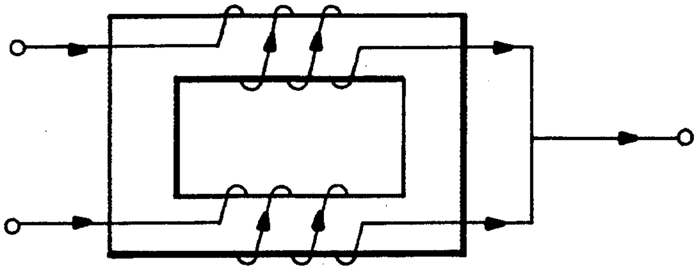
Fig. 2 (PRIOR ART)
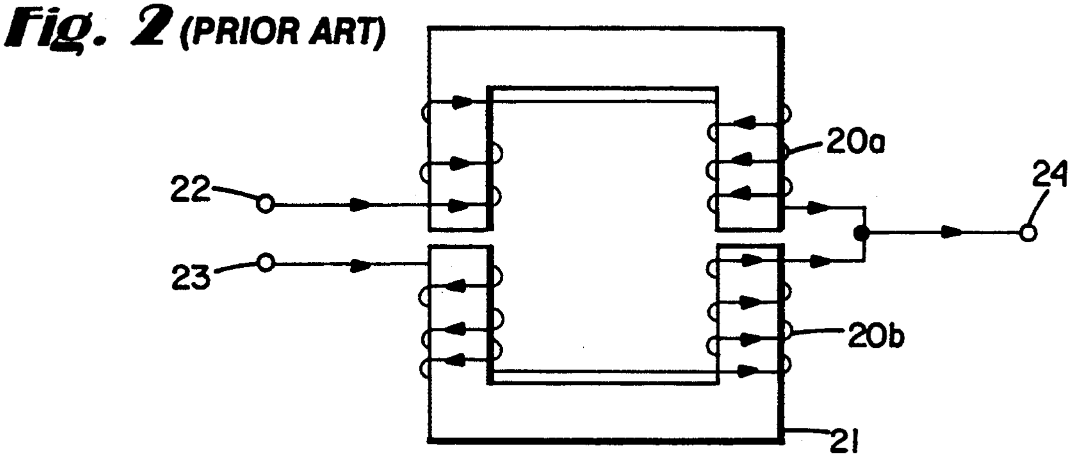
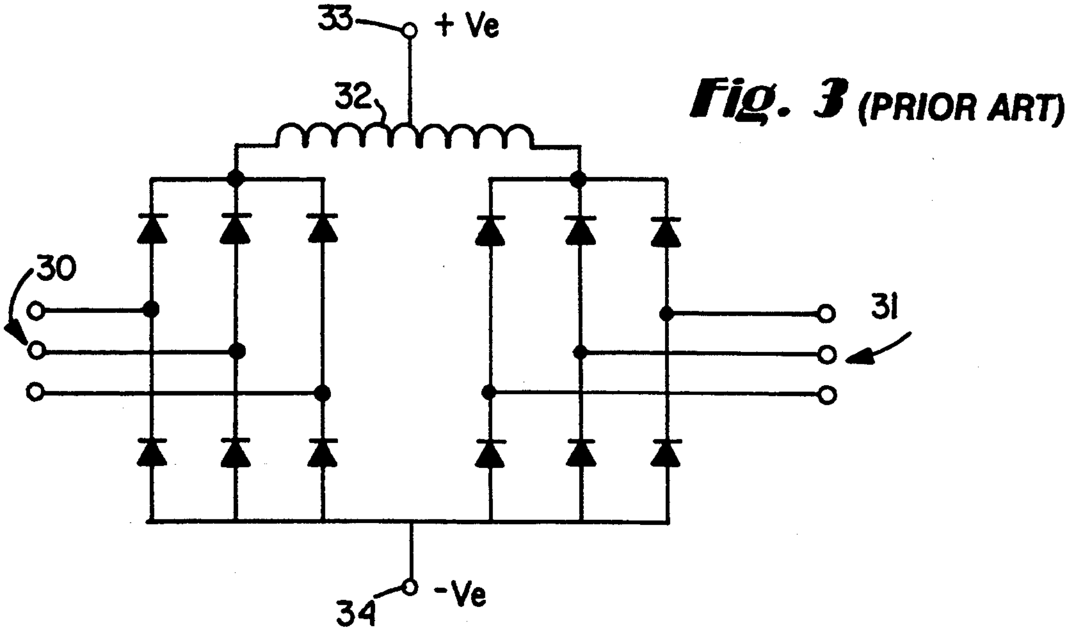
Fig. 3 (PRIOR ART)

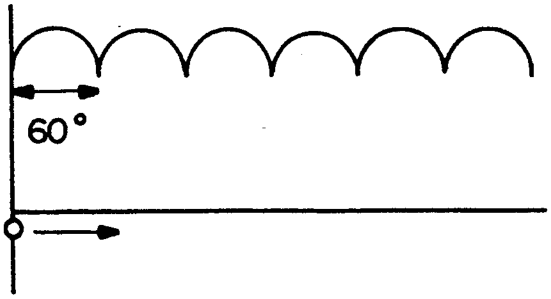
Fig. 4A (PRIOR ART)
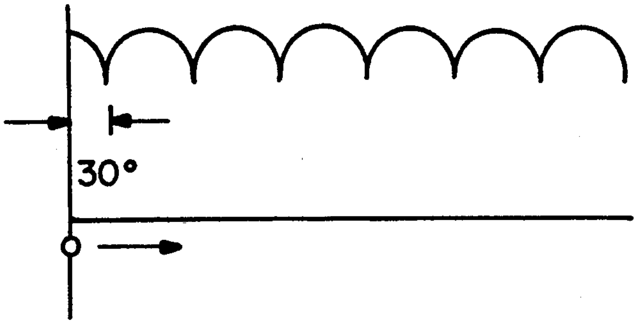
Fig. 4B (PRIOR ART)
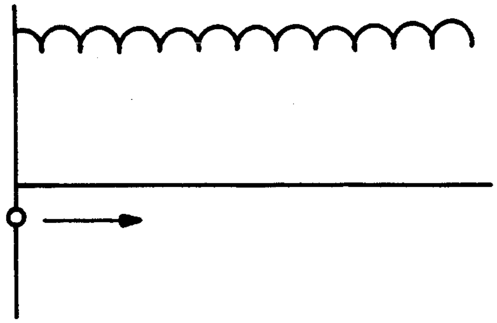
Fig. 4C (PRIOR ART)
Fig. 5 (PRIOR ART)
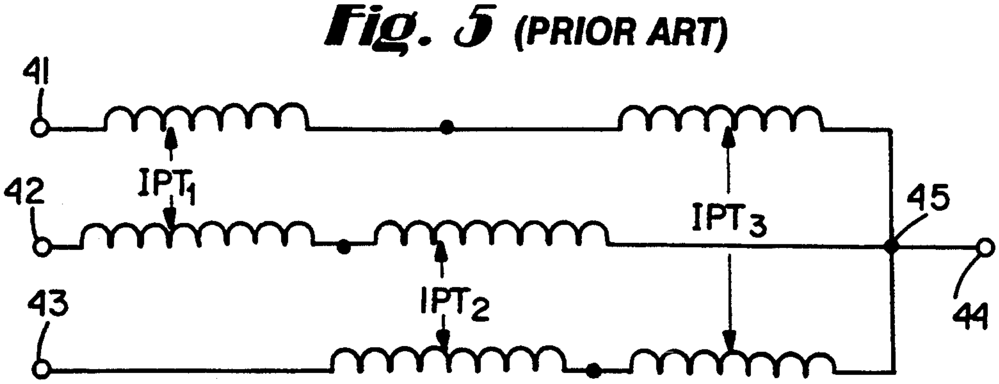

Fig. 6
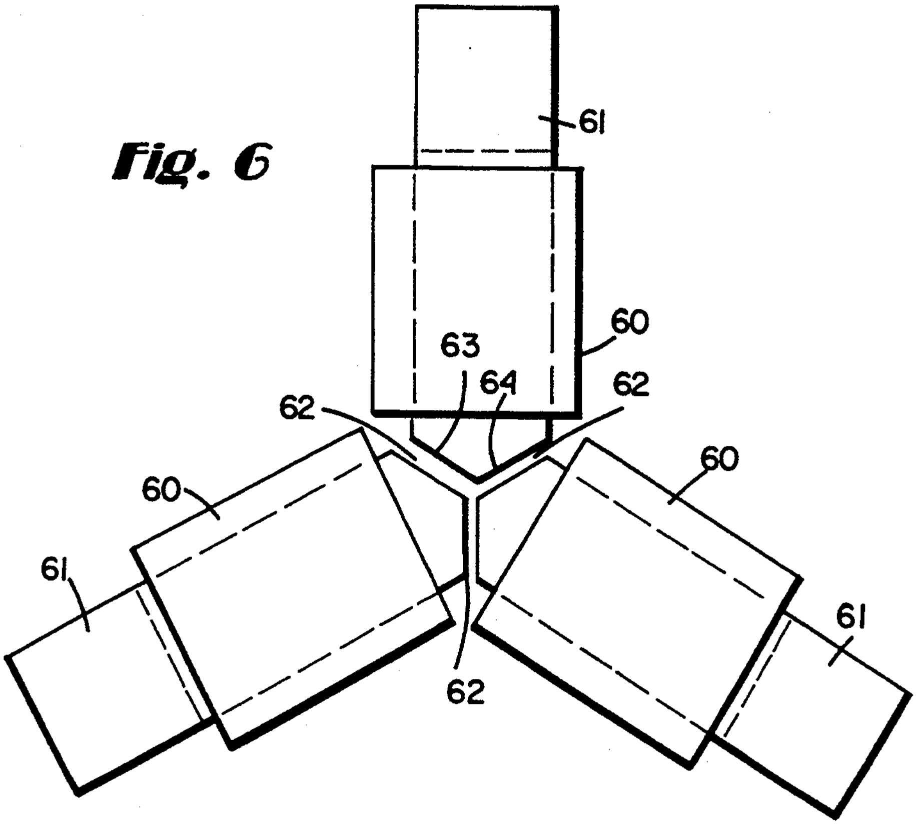
Fig. 7
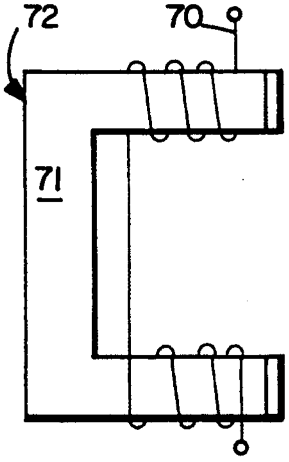
Fig. 9
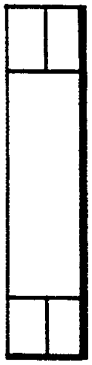
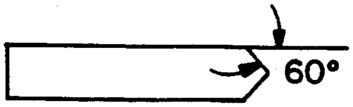
Fig. 8

CONTROLLED LEAKAGE FIELD MULTI-INTERPHASE TRANSFORMER EMPLOYING C-SHAPED LAMINATED MAGNETIC CORE

FIELD OF THE INVENTION

The invention relates to improvements in interphase transformers as used in power conditioners, such as bridge rectifiers, load commutated inverters or cycloconverters, wherein system weight, size and volume are minimized along with a reduction in the number of connections and a reduction in flux fringing due to the main output current.

BACKGROUND AND SUMMARY OF THE INVENTION

Basic interphase transformers of the nature illustrated in FIG. 1 have been known for some time for paralleling outputs of multi-phase power electronic circuits employed in power conditioners. Such basic interphase transformers, however, exhibit significant output current flux fringing. As indicated in FIG. 2, modified interphase transformers employing two C-shaped magnetic core halves 21 with windings 20*a* and 20*b* and air gaps between the laminated steel core halves are also well known. Such modified interphase transformers with inputs 22 and 23 along with output 24 offer the advantage of minimizing the main output current fringing flux.

These conventional modified interphase transformers when properly designed are well suited for paralleling six phase (dual three phase) sources feeding power conditioners such as cycloconverters. However, important design parameters for said systems must always take into consideration system weight, size, volume and, of course, cost. Although, as aforementioned, the above noted conventional interphase transformers serve well for the paralleling of six phase outputs, the required number of such interphase transformers increases significantly when inputs of a nine, twelve or even higher number of phases are involved. Such increases in the number of transformers are required for balanced filtering, paralleling of output current for controlling the level of circulating current and commutation of thyristors or the like.

Where, for example, a system involves nine input phases, three interphase transformers are necessary. Moreover, the number of interphase transformers increases to six for a system involving twelve input phases. The mathematical rule is that the combination of the number of three phase groups taken two at a time equals the required number of interphase transformers per output phase. Similar increases in the number of interphase transformers are necessary for still further increases in the number of input phases. Clearly, such significant increases add substantially to system weight, size, volume and cost.

An additional factor adding to the system complexity and costs where nine or more phases are to be paralleled are not only the number of additional interphase transformers required for balanced filtering and commutation, etc., but also the number of connections that are necessary among the elements. For example, for a nine phase system as schematically illustrated in FIG. 5, an arrangement of three interphase transformers with inputs from each of the three three phase groups 41, 42 and 43 results in a total of nine connections per output phase, including the common connections. A system involving three output phases with a nine phase input source thus requires three arrangements of the nature shown in FIG. 5. Such an arrangement has the disadvantages of a reduction in balanced filtering, good paralleling, as well as unbalanced commutation coupled with more complexity and an increased number of connections.

My invention involves the discovery that the advantages of the prior art arrangements; namely, minimum flux fringing, balanced filtering and paralleling, as well as commutation of a six phase system, may be extended to a system with more than six phases through the use of a single multi-interphase transformer per output phase. Although my multi-interphase transformer optionally can be designed for any number of phases of the source (preferably a multiple of three), it is particularly advantageously used in any power conditioner having an input power source with more than six phases and requiring an interphase transformer.

As described in more detail below, the multi-interphase transformer of the present invention includes three or more C-shaped cores each including a winding with one end of each winding commonly connected to an output phase terminal and with the other ends of each winding connected to an output lead of a power conditioner fed by polyphase sources. Air gaps among the core assemblies are formed between angled planar surfaces at the ends of the C-shaped cores. Selection of appropriate clearances and other magnetic circuit parameters for obtaining appropriate low frequency and end-to-end inductances allows application to a wide range of power conditioning systems without adversely affecting filtering and commutation balance. Moreover, the requirement of only one multi-interphase transformer per output phase allows a system design with minimum system weight, size and volume. Additionally, since fringing flux due to the main output current is minimized, other components, as well as the system chassis, may be positioned closer to the multi-interphase transformer than would be required for other prior art designs.

Thus, the principal objective of my invention is that of extending the advantages of the above noted conventional modified interphase transformers of FIG. 2 (ideal for a six phase source) to power sources with more than six phases, while additionally eliminating the disadvantages of the conventional systems of FIG. 5. In this regard, the exemplary embodiment disclosed herein may serve as a replacement device in a polyphase system for a number of conventional modified interphase transformers, as well as replacing and further reducing the number of required connections conventionally found in interphase transformer systems employed with power sources with more than six phases.

BRIEF DESCRIPTION OF THE DRAWINGS

These as well as other objects and advantages will be better appreciated by a careful study of the following detailed description taken in conjunction with the accompanying drawings in which:

FIG. 1 is an illustration of a conventional basic interphase transformer;

FIG. 2 is an illustration of a modified interphase transformer which is known in the prior art;

FIG. 3 schematically illustrates a prior; art and currently used interphase transformer with dual three phase inputs;

FIGS. 4A to 4C are output voltage diagrams illustrating the separate and combined pulse ripple effect produced in the circuit of FIG. 3 for two three phase sources having a 30° phase difference;

FIG. 5 is an illustration of one output phase of a prior art arrangement having three interphase transformers required for a nine phase source power conditioning system;

FIG. 6 is a top view of an exemplary embodiment of a multi-phase transformer of the present invention for producing an output phase of a nine phase input source based power conditioning system;

FIG. 7 is a side view of one C-shaped core assembly including a winding as utilized in the arrangement illustrated in FIG. 6;

FIG. 8 is a bottom view of the C-shaped core assembly of FIG. 7 but with the winding omitted;

FIG. 9 is an end view of the C-shaped core assembly of FIG. 7 but with the winding omitted.

DETAILED DESCRIPTION OF THE INVENTION

Figure 10:
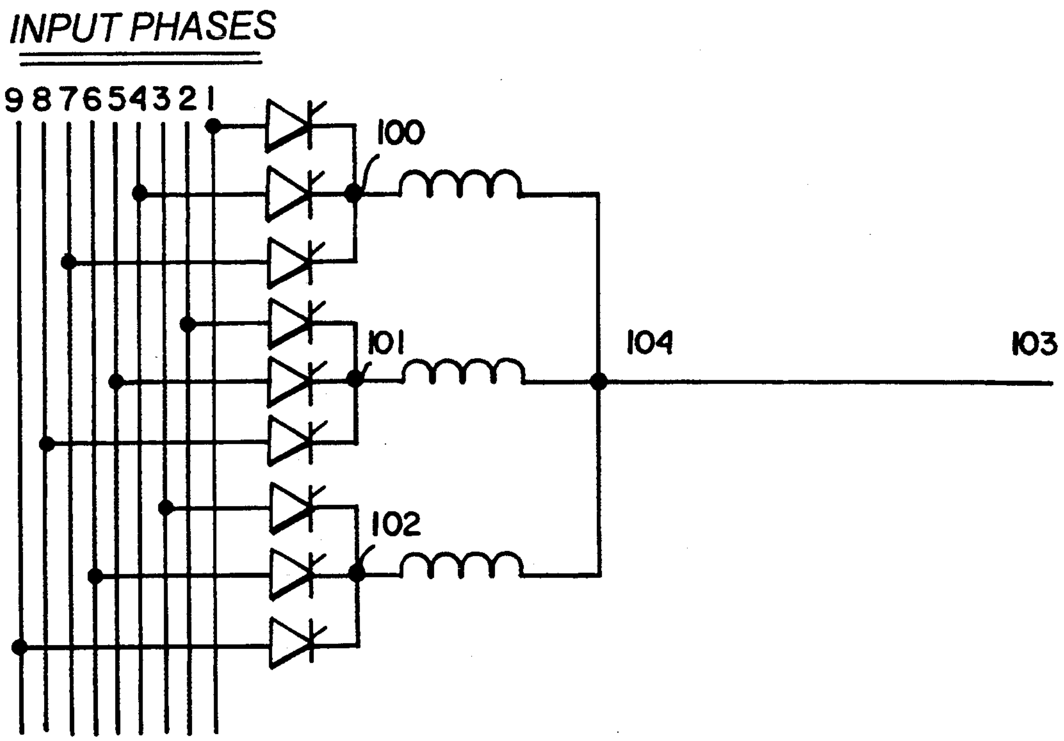
FIG. 10 is a schematic circuit illustrating the multi-interphase transformer coil connections for the exemplary embodiment of FIG. 6.

Modified interphase transformers of the nature illustrated in FIG. 2 which were developed subsequent to the basic interphase transformer incorporated two equal air gaps between the two C-shaped cores. This feature along with careful selection of the number of turns per winding and careful selection of core cross sections and an array of still further design parameters minimized main output fringing flux. Moreover, the use of such modified interphase transformers produced acceptable balanced filtering and commutation where six phase (dual three phase) sources 22 and 23 are to be paralleled at the output 24.

For example, as schematically illustrated in FIG. 3, three phase sources 30 and 31 connected, as illustrated, to interphase transformer 32 may be used to produce a DC voltage of the nature illustrated in FIG. 4C having a twelve pulse voltage ripple. Where the two three phase sources have a 30° phase difference, source 30 will produce a six pulse voltage output of the nature illustrated in FIG. 4A; whereas, source 31 produces a six pulse voltage ripple as may be seen in FIG. 4B. The combined paralleled output, however, is that of FIG. 4C.

The interphase transformer acts as a Low pass filter for DC as well as 12th, 24th, etc., harmonics produced at the output terminals 33 and 34. The interphase transformer provides high inductance to 6th, 18th, etc., harmonic voltages to thus reduce the associated ripple current. Such 6th, 18th, etc., harmonic ripple currents circulate from one bridge to the next without affecting or being a part of the load current. The 12th, 24th, etc., harmonic currents, however, depend upon the low interphase transformer inductance along with the load inductance. Such interphase transformers may also be used with cycloconverters for the purpose of paralleling low frequency outputs. Moreover, as aforementioned, the use of modified interphase transformers effectively minimizes the output current fringing flux.

As may be seen from the above, the interphase transformer circuit of FIG. 3 produces beneficial results with a relatively low level of complexity, weight and cost. However, where the outputs of a nine, twelve or even higher number of phases are paralleled, a substantial increase in the number of interphase transformers is required in order to obtain balanced filtering and commutation. For example, in an exemplary system having nine input phases, three interphase transformers are required for each output phase. Moreover, this number increases to six such transformers per output phase for a system involving twelve input phases and so on. Under such circumstances, clearly system weight and size significantly increase. Furthermore, the number of required connections among the system elements significantly increase system complexity and the associated higher probability of connection errors.

As may be seen from the schematic illustration of FIG. 5, three input terminals 41, 42 and 43 each representative of a three phase input and a one phase output terminal 44 involves the use of three interphase transformers (nine for a three phase output). Moreover, it will be noted that each interphase transformer involves three connections including the common connection 45, thus requiring nine connections per output phase. Additionally, such a system adversely affects filtering, balanced commutation, et cetera.

The improved multi-interphase transformer structure of the exemplary embodiment illustrated in FIGS. 6 through 10 overcomes the above noted deficiencies associated with the use of several modified interphase transformers as used in prior art polyphase systems involving the paralleling of input power sources having more than six phases. However, the structure of my multi-interphase transformer combines the advantages of the noted prior art approaches in such a manner as to produce a less costly, smaller lightweight system requiring fewer elements and their associated connections, as well as achieving minimum flux fringing and balanced filtering and commutation. Only one multi-interphase transformer is required per each output phase to obtain such advantages.

As schematically illustrated in FIG. 10, three three phase sources connected through the power conditioner to input terminals 100, 101 and 102 may be paralleled to produce one output phase at terminal 103. Clearly only six connections (including the three common connections at 104) are required per output phase. Thus, the present exemplary nine phase input power source of my multi-interphase transformer is less complex and requires fewer connections, vis-a-vis, the similar such system of FIG. 5 which uses three conventional interphase transformers.

Additionally, as may be seen from a consideration of FIGS. 6 through 9, a reduction in the number of elements per output phase is obtained for polyphase input systems involving more than six phases. For example, my multi-interphase transformer for the exemplary nine phase source involves three C-shaped cores 61 each with a winding 60, thus producing three identical core assemblies 72 of the nature shown in more detail in FIG. 7. The exemplary nine phase input source system additionally includes air gaps 62 formed between the angled planar surfaces 63 and 64 of each of the core legs.

As may be seen from a consideration of FIGS. 6 through 9, equal air gaps 62 are formed between the respective surfaces of each of the cores wherein each of the surfaces 63 and 64 is positioned at a 60° angle with respect to the side surface of the core elements 61 as shown in FIG. 6. Although the embodiment illustrated is directed to the paralleling of a nine phase input source system, the principles of my multi-interphase transformer are applicable to systems involving a higher number of input phases (preferably in multiples of three). For example, a twelve phase source based power conditioning system would require four core assemblies of the nature illustrated in FIG. 7 but with the surfaces 63 and 64 positioned at angles of 45° to the side surfaces of the C-shaped cores 61.

Although a vast array of design parameters are involved in any particular system application involving interphase transformers, the structural design of my transformer involves parameters similar to those selected for prior art modified interphase transformers except for defining the air gap clearances, number of turns in the windings and core cross section dimensions so as to properly adjust the coefficients for calculating low frequency and end-to-end inductances. Laminated steel core sections along with insulated copper wire windings are, of course, contemplated. However, the concept involved in my multi-interphase transformer is obviously applicable to a wide range of power conditioning systems involving a selection of parameters for producing an appropriate design for a particular application. It is believed, however, that the skilled artisan armed with the above noted detailed teachings can readily produce an optimally designed, relatively small, lightweight and low cost system for a particular application by merely applying that level of skill expected of the artisan.

While the invention has been described with respect to what is presently regarded as the most practical embodiments thereof, it will be understood by those of ordinary skill in the art that various alterations and modifications may be made which nevertheless remain within the scope of the invention as defined by the claims which follow.

What is claimed is:

1. A multi-interphase transformer for use in paralleling outputs of a polyphase input power source having nine or more phases, said transformer comprising:

at least three magnetic core sections each having first and second leg portions with first, and second ends and a third leg portion disposed between the first ends of said first and second leg portions;

the second ends of the first and second leg portions of each core section being positioned in adjoining relationship with at least two other core sections to form a space gap between the first and second leg sections of each adjoining core section so as to control leakage fields related to D.C. or low frequency inductance;

a single continuous winding disposed in inductive relationship with each said core section, each said winding being wound substantially equally around the first and second leg portions of a core section and having first and second ends;

the first ends of each of said windings being commonly connected with one another;

the second ends of each of said windings being connected to a three phase symmetrical input source, and wherein the second ends of the first and second leg portions of each core section include adjacent surfaces for forming predetermined substantially uniform space gaps with each said adjoining core section so as to control high frequency inductance of the core sections.

2. A multi-interphase transformer as in claim 1 wherein the single continuous winding for each said core section has an equal number of turns disposed on said first and second leg portions and no turns disposed on said third leg portion.

3. A multi-interphase transformer as in claim 1 wherein the second ends of the first and second leg portions of each core section include two intersecting planar surfaces for forming substantially uniform space gaps with each said adjoining core section.

4. A multi-interphase transformer as in claim 1 where each said core section is a C-shaped core section.

5. A multi-interphase transformer as in claim 1 wherein said core sections are laminated ferromagnetic core sections.

6. A multi-interphase transformer as in claim 1 wherein there are three said core sections, each of said second ends of said windings are connected to a three phase input power source and said first commonly connected ends of said windings form one output phase of said parallel outputs.

7. A multi-interphase transformer as in claim 6 wherein each of said three phase power sources are phase shifted with respect to one another.

8. A power conditioning system for paralleling outputs of a polyphase input power source and having an input power source with nine or more phases, and said system including a single multi-interphase transformer per output phase wherein said multi-interphase transformer comprises:

at least, three magnetic core sections each having first and second leg portions with first and second ends and a third leg portion disposed between the first ends of said first and second leg portions;

the second ends of the first and second leg portions of each core section being positioned in adjoining relationship with at least two other core sections to form a space gap between the first and second leg sections of each adjoining core section so as to control leakage fields related to D.C. or low frequency inductance;

a single continuous winding disposed in inductive relationship with each said core section, each said winding being wound substantially equally around the first and second leg portions of a core section and having first and second ends;

the first, ends of each of said windings being commonly connected with one another:

the second ends of each of said windings being connected to a three phase symmetrical input source, and wherein the second ends of the first and second leg portions of each core section include adjacent surfaces for forming predetermined substantially uniform space, gaps with each said adjoining core section so as to control high frequency inductance of the core sections.

9. A power conditioning system as in claim 8 wherein said system includes a nine phase input power source and three said output phases.

* * * * *